United States Patent
Bjorkman et al.

(10) Patent No.: US 10,041,539 B2
(45) Date of Patent: Aug. 7, 2018

(54) DOUBLE-ROW SPHERICAL ROLLER BEARING, MANUFACTURING METHOD AND WIND TURBINE BEARING ARRANGEMENT

(71) Applicants: Emma Bjorkman, Trollhättan (SE); Peter James, Mölndal (SE); Marcus Loof, Nol (SE); Lars Stigsjöö, Angered (SE)

(72) Inventors: Emma Bjorkman, Trollhättan (SE); Peter James, Mölndal (SE); Marcus Loof, Nol (SE); Lars Stigsjöö, Angered (SE)

(73) Assignee: AKTIEBOLAGET SKF, Gothenburg (SE)

( * ) Notice: Subject to any disclaimer, the term of this patent is extended or adjusted under 35 U.S.C. 154(b) by 233 days.

(21) Appl. No.: 14/969,668

(22) Filed: Dec. 15, 2015

(65) Prior Publication Data
US 2016/0178001 A1    Jun. 23, 2016

(30) Foreign Application Priority Data
Dec. 19, 2014 (SE) ...................................... 1451596

(51) Int. Cl.
*F16C 33/58* (2006.01)
*F16C 19/38* (2006.01)
(Continued)

(52) U.S. Cl.
CPC .............. *F16C 33/586* (2013.01); *C21D 9/40* (2013.01); *F16C 19/38* (2013.01); *F16C 23/086* (2013.01);
(Continued)

(58) Field of Classification Search
CPC ...... F16C 19/38; F16C 23/082; F16C 23/086; F16C 33/585; F16C 33/586;
(Continued)

(56) References Cited

U.S. PATENT DOCUMENTS

| | | | |
|---|---|---|---|
| 9,227,720 B2 * | 1/2016 | Habibvand | ............... B64C 9/02 |
| 2010/0058593 A1 | 3/2010 | Kurashita | |
| 2014/0248016 A1 * | 9/2014 | Habibvand | ......... F16C 33/7889 384/482 |

* cited by examiner

*Primary Examiner* — James Pilkington
(74) *Attorney, Agent, or Firm* — Bryan Peckjian; SKF USA Inc. Patent Dept.

(57) ABSTRACT

A double-row spherical roller bearing comprising an outer ring which presents a first and a second spherical raceway on a radially inner peripheral surface, an inner ring which presents a first and a second outer curved-shaped raceway. Moreover, roller elements are arranged in a first and second roller row being axially displaced from each other, and arranged in-between the respective first and second inner raceways of the outer ring and the first and second outer raceways of the inner ring. The outer ring includes a first groove on the radially inner peripheral surface located in-between the first and second inner raceways, extending radially outwardly and in the circumferential direction of the ring. The first and second inner raceways have hard turned surfaces. The first groove presents a hardened surface which has not undergone any post-hardening machining operation. The double-row spherical roller bearing can be a wind turbine bearing arrangement.

11 Claims, 4 Drawing Sheets

(51) Int. Cl.
*C21D 9/40* (2006.01)
*F16C 33/64* (2006.01)
*F16C 23/08* (2006.01)

(52) U.S. Cl.
CPC ............ *F16C 33/583* (2013.01); *F16C 33/64* (2013.01); *F16C 2223/00* (2013.01); *F16C 2300/14* (2013.01); *F16C 2360/31* (2013.01)

(58) Field of Classification Search
CPC .............. F16C 33/6622; F16C 33/6659; F16C 2360/31; F03D 80/70
See application file for complete search history.

DOUBLE-ROW SPHERICAL ROLLER BEARING, MANUFACTURING METHOD AND WIND TURBINE BEARING ARRANGEMENT

CROSS REFERENCE TO RELATED APPLICATION

This is a Non-Provisional Patent Application, filed under the Paris Convention, claiming the benefit of Sweden (SE) Patent Application Number 1451596-9, filed on 19 Dec. 2014 (19 Dec. 2014), which is incorporated herein by reference in its entirety.

TECHNICAL FIELD

According to a first aspect, the present disclosure regards a double-row spherical roller bearing.

According to a second aspect, the present disclosure regards a method of manufacturing an outer ring of a spherical roller bearing.

According to a third aspect, the present disclosure regards a wind turbine bearing arrangement.

BACKGROUND OF THE PRESENT INVENTION

Rolling bearings are common mechanical elements that are used in many different applications. There are different kinds of rolling bearings, which are designed to fulfill different requirements. Depending on the conditions of a specific application, i.e. load level, rotation speed, temperature etc., there are different kinds of suitable rolling bearings. One bearing type is spherical roller bearing (SRB). This bearing is designed to accommodate radial and axial loads, but also it is designed to be able to accommodate shaft deflections, i.e. the bearing rings are able to be relatively misaligned. Thus, this bearing is especially suitable for more demanding industrial applications, such as machines in pulp & paper industry, wind turbines etc.

For some SRB types there is a groove on the outer peripheral surface of its outer ring, in which groove there are a number of lubrication bores. The groove is designed to be as narrow as possible for not affecting the load carrying capacity of the bearing. The purpose of the groove is to receive lubricant from the outside and to therefrom enter into the lubrication bores to thereby lubricate the bearing. The lubricant may for example be oil or grease.

The inner sphere raceway on the outer ring of a spherical roller bearing may be hard machined. This may be a time consuming and also costly process, but on the other hand it also leads to a surface with good properties and a high quality.

BRIEF SUMMARY OF THE PRESENT INVENTION

In view of the above, an object of the disclosure is to provide an improved and updated bearing design. More specifically, an object of the present disclosure is to provide a spherical roller bearing which presents a more cost-efficient design and at the same time maintains its high performance.

According to the first aspect, the object has been achieved by a double-row spherical roller bearing, comprising, an outer ring presenting a first and a second spherical raceway on a radially inner peripheral surface, an inner ring presenting at least one radially outer curved-shaped raceway, roller elements arranged in a first and second roller row being axially displaced from each other, and being arranged in-between the respective first and second inner raceways of the outer ring and the at least one outer raceway of the inner ring. The outer ring further presents a first groove on the radially inner peripheral surface located in-between the first and second inner raceways, and extending radially outwardly and in the circumferential direction, wherein the first and second inner raceways present hard machined surfaces and wherein the first groove presents a hardened surface which has not undergone any post-hardening machining operation.

With this design where there is a groove on the radially inner peripheral surface of the outer ring, and wherein the groove has not undergone any post-hardening machining operation, an improved lubrication of the bearing raceways and a more cost-efficient bearing can be realized. Further, the groove may act as a lubrication reservoir in the bearing. Only the first and second raceways on the outer ring have to undergo a post-hardening machining step. This leads to that a smaller surface has to undergo the post-hardening machining step. In an embodiment, the post-hardening machining step is a hard turning step. In addition, this will lead to that the wear of the machining tool, e.g. a hard turning cutting tool, will be reduced. This is not only related to the fact that a smaller surface has to be machined, but also the inventors have realized that an interrupted surface is advantageous for the hard machining process. Thus, in addition to the reduced wear of the machining tool, the quality of the two raceway surfaces may be improved. Further, the groove enables soft drilling of the lubrication grooves without introducing interrupted cuts in the subsequent hard turning process. Further, since the first groove will not undergo any post-hardening machining step, the first groove will present a somewhat black or grey color which emanates from the hardening of the ring. The visual appearance of a hardened steel surface is something which is easily recognized by a skilled person since the color of such a surface is somewhat black or grey. In addition, if a surface has undergone a post-hardening machining operation it can easily be recognized by a skilled person, especially since it is possible to see that there is a certain post-machining pattern and texture on the machined surface. Also, the black or grey color from the hardening will no longer be present.

In this document, axial and radial directions are mentioned and used to explain many of the features of this disclosure. Unless expressed otherwise for any of the embodiments herein, axial direction is the direction following the rotational axis of the roller bearing, and wherein radial direction is a direction which is perpendicular to the rotational axis of the roller bearing.

According to an embodiment of the present disclosure, the first groove presents a radial depth being in the interval 2 to 6 millimeters, and more preferably essentially 4 millimeters. The groove may not be too deep since that can affect the load carrying capability of the outer ring and also it may lead to increased stresses in the outer ring. On the other hand, due to uneven hardening growth during hardening of the outer ring, the groove may also not be too shallow.

In an embodiment of the present disclosure, the first groove presents a maximum axial width extending such that the inner and outer ring can be relatively misaligned up to 5 degrees without any roller element being displaced axially inwardly to an extent such that the roller element interferes with the first groove. Thus the width of the first groove may be set with regard to the ability of the spherical roller bearing to misalign. In a further embodiment, the first groove presents a maximum axial width extending such that the inner and outer ring can be relatively misaligned up to 4, 3, 2 or 1 degree without any roller element being displaced inwardly to an extent such that the roller element interferes with the first groove.

In an embodiment of the present disclosure, the first groove presents a minimum axial width of 10 millimeters. In another embodiment, the first groove presents a minimum axial width of 11, 12, 13, 14, 15, 16, 17, 18, 19 or 20 millimeters.

In an embodiment of the present disclosure, the first groove presents an axial width which is defined as:

$$(0.75 \text{ to } 0.97)*(OR_w - 2*R_1)$$

wherein $OR_w$ is the axial width of the outer ring and wherein $R_1$ is the axial length of the roller elements. It has namely been realized by the inventors that a groove which has such an axial extension as in the above identified interval leads to a cost-efficient solution, reduces tool wear of the hard machining tool, and further does not negatively affect the bearing's performance. In addition, the large groove may act as a lubrication reservoir and since the groove is located close to the raceway surfaces of the outer ring lubrication may be even further improved. In another embodiment of the present disclosure, the first groove presents an axial width where the factor in the interval between 0.75 and 0.97 is essentially 0.8.

In an embodiment of the present disclosure, at least one axial end of the first groove presents a radius being from 6 to 10 millimeters, or more preferably essentially 8 millimeters. The radius is seen in a cross sectional view of the bearing, wherein the cross sectional view is defined by a plane, wherein the rotational axis of the bearing is in the plane. For manufacturing purposes it is suitable to have a certain radius on the axial ends of the first groove. A radius of essentially 8 millimeters has been recognized to be especially suitable since the machining tools' design and geometry is adapted to make a radius of such magnitude.

In an embodiment of the present disclosure, the outer ring further presents on its outer peripheral surface a second groove extending radially inwardly and in the circumferential direction. In yet a further embodiment, the second groove has not undergone any post-hardening machining operation. As for the first groove, the same effects and advantages can be seen by having a second groove which has not undergone any post-hardening machining step. In yet a further embodiment, when there is a second groove on the radially outer peripheral surface of the outer ring, the roller elements in each roller row presents a nominal roller position in the bearing, and the second groove further presents a width X and location on the outer peripheral surface which fulfills the following relation:

$$L_1 \leq X \leq L_2,$$

wherein $L_2$ extends between a first and second axial end point on the outer peripheral surface, which first end point is defined as the intersection between a first normal vector and the outer peripheral surface, wherein the first normal vector is an inverted normal vector of the first inner raceway and starts from a position located at the axially inner end face of a roller in the first roller row at its nominal roller position, and which second end point is defined as the intersection between a second normal vector and the outer peripheral surface, wherein the second normal vector is an inverted normal vector of the second inner raceway and starts from a position located at the axially inner end face of a roller in the second roller row at its nominal roller position, and wherein $L_1$ has a length of $L_2*\frac{1}{3}$ and where the end points of $L_1$ are located with equal distances to each respective first and second end point of $L_2$. By having a second groove which is as large as possible without negatively affecting the performance of the bearing, the cost in manufacturing may be even further reduced. It has namely been realized by the inventors that by having a second groove which presents the above defined axial width, a relatively large groove can be accomplished without negatively affecting the bearing performance. More specifically, when the outer ring is subjected to a load, stress zones will be created at the contact area between the outer ring and the roller elements. If the second groove is extending axially such that it does not enter the area of the stress zones, the bearing performance will not be negatively affected.

By nominal roller position is meant the position of the roller when the roller center point is located along the axis of the contact angle of the roller bearing. Furthermore the rotational axis of the roller is perpendicular to the axis of the contact angle. In addition, the roller raceway is in contact with the inner ring raceway. The roller center point is on the plane defined by the rollers' largest diameter and which is perpendicular to the roller rotational axis. The contact angle of one of the rollers in one of the roller rows of the bearing is defined as a line intersecting two points, wherein the first point is the center point of the sphere defined by the inner raceway of the outer ring located on the rotational axis of the bearing, and wherein the second point is the radial centre of the corresponding inner ring raceway surface.

In an embodiment of the present disclosure, a double-row spherical roller bearing is disclosed, wherein $L_1$ is any of $L_2*0.4$ or $L_2*0.5$ or $L_2*0.6$ or $L_2*0.7$ or $L_2*0.8$ or $L_2*0.9$. In yet another embodiment, $L_1$ is any of 22, 24, 26, 28, 30, 32, 34, 36, 38, 40, 42, 44, 46, 48, or 50 mm (millimeters).

In another embodiment of the present disclosure, the second groove presents an axial width X in-between $L_1$ and $L_2$ which is defined as:

$$X=(0.92 \text{ to } 0.96)*(OR_w - 2*R_1)$$

wherein $OR_w$ is the axial width of the outer ring and wherein $R_1$ is the axial length of the roller elements. In another embodiment, the factor in the interval from 0.92 to 0.96 is essentially 0.95.

In a further embodiment, the outer ring further presents at least one radially extending lubrication bore, wherein the at least one lubrication bore presents an inlet on the radially outer peripheral surface and an outlet in the first groove. In yet a further embodiment, the inlet of the lubrication groove is in the second groove. Due to this design, wherein the outlet of the lubrication bore is located in the first groove, the lubrication bore may be made in a soft state, i.e. it may be drilled before the outer ring has been subjected to hardening. Due to this, the manufacturing may be made at a lower cost.

In a further embodiment of the present disclosure, the double-row spherical roller bearing is a large size roller bearing with an outer diameter of at least 500 mm. It has been realized by the inventors that the first groove, and also the second groove, are especially advantageous when the bearing is a large bearing. In another embodiment of the present disclosure, a large size roller bearing is a bearing with an outer diameter of at least 600, 700, 800, 900, 1000, 1100, 1200, 1300, 1400 or 1500 mm.

In an embodiment of the present disclosure, the roller bearing presents symmetrical rollers. In another embodiment, the rollers are asymmetrical rollers. The symmetry of the rollers is seen along the rotational axis of the roller elements. A roller is symmetrical if its center point, or centre of gravity, is located on the roller's rotational axis and at an equal distance between the axial roller ends. A symmetrical and asymmetrical spherical roller element is something which is well recognized by the skilled person and described in literature (e.g. Rolling Bearing Analysis by Tedric A. Harris (ISBN 0-471-79979-3)).

According to the second aspect of the disclosure, the object is achieved by a method of manufacturing an outer ring of a double-row spherical roller bearing, wherein the outer ring presents a radially outer peripheral surface and a radially inner peripheral surface. The method comprises the following steps:

soft-machining a first and a second surface which extends in a circumferential direction on the radially inner peripheral surface, wherein the first and second surfaces are axially displaced from each other, and soft-machining a first groove on the radially inner peripheral surface which extends radially outwardly and in the circumferential direction, and wherein the first groove is axially located in-between the first and second surfaces. This is then followed by the steps:

hardening the outer ring, and subsequently hard machining the first and second surfaces It shall be noted that all embodiments of the second aspect of the disclosure are applicable to the first aspect of the disclosure and vice versa.

In an embodiment of the method, the first groove does not undergo any post-hardening machining step.

With this manufacturing process where there is a groove on the radially inner peripheral surface of the outer ring, and wherein the groove has not undergone any post-hardening machining operation, a more cost-efficient outer ring can be realized. Especially, only the first and second raceways on the outer ring have to undergo a post-hardening machining step. This leads to that a smaller surface has to undergo the post-hardening machining step. In addition, this will lead to that the wear of the machining tool, e.g. a hard turning cutting tool, will be reduced. This is not only related to the fact that a smaller surface has to be machined, but also the inventors have realized that there is a further advantage of having an interruption in the machining operation since that will lead to that the machining tool will have time to cool down between the machining operation of the first raceway surface and the second raceway surface. Thus, in addition to the reduced wear of the machining tool, the quality of the two raceway surfaces may be improved. Further, since the first groove will not undergo any post-hardening machining step, the first groove will present a somewhat black or grey color which emanates from the hardening of the ring. The visual appearance of a hardened steel surface is something which is easily recognized by a skilled person since the color of such a surface is somewhat black or grey. In addition, if a surface has undergone a post-hardening machining operation it can easily be recognized by a skilled person, especially since it is possible to see that there is a certain post-machining pattern and texture on the machined surface. Also, the black or grey color from the hardening will no longer be present.

In an embodiment of the method, the hard machined first and second surfaces present spherically shaped surfaces. In yet a further embodiment, the first and second spherical surfaces are raceways of the outer ring.

In an embodiment of the method, the hard machined first and second surface are further subjected to a cup-polishing step. The cup-polishing will also benefit from that there is a groove. The cup may polish the first and second spherical surfaces simultaneously and since there will be a non-contacting area on the cup due to the presence of the groove, the cooling of the cup will be improved. This will in turn lead to a reduced wear of the cup, but also it may lead to an increased quality of the first and second surfaces.

In an embodiment of the method, at least one radially extending lubrication bore is soft-drilled, wherein the lubrication bore presents an inlet on the radially outer peripheral surface and an outlet in the first groove. Further, the first groove enables soft drilling of the lubrication grooves without introducing interrupted cuts in the subsequent hard turning process.

In another embodiment of the method, a lubrication groove is soft machined on the radially outer peripheral surface of the outer ring. In addition, the lubrication groove is not subjected to any post-hardening machining step. As for the first groove, the cost in manufacturing the outer ring may be even further reduced since the need of hard turning will be reduced. Only the part of the radially outer peripheral surface where there is no second groove may need to undergo a post-hardening machining step.

According to the third aspect of the disclosure, the object is achieved by a wind turbine bearing arrangement, which comprises, a rotor shaft connected to a hub, wherein rotor blades are connected to the hub, at least one bearing for rotatably supporting the rotor shaft, wherein the bearing is a double-row spherical roller bearing according to any embodiment of the first aspect of the disclosure.

It shall be noted that all embodiments of the third aspect of the disclosure are applicable to the first and second aspect of the disclosure and vice versa.

BRIEF DESCRIPTION OF DRAWINGS

Exemplifying embodiments of the present disclosure will now be described in more detail, with reference to the accompanying drawings, wherein.

Figure 1:
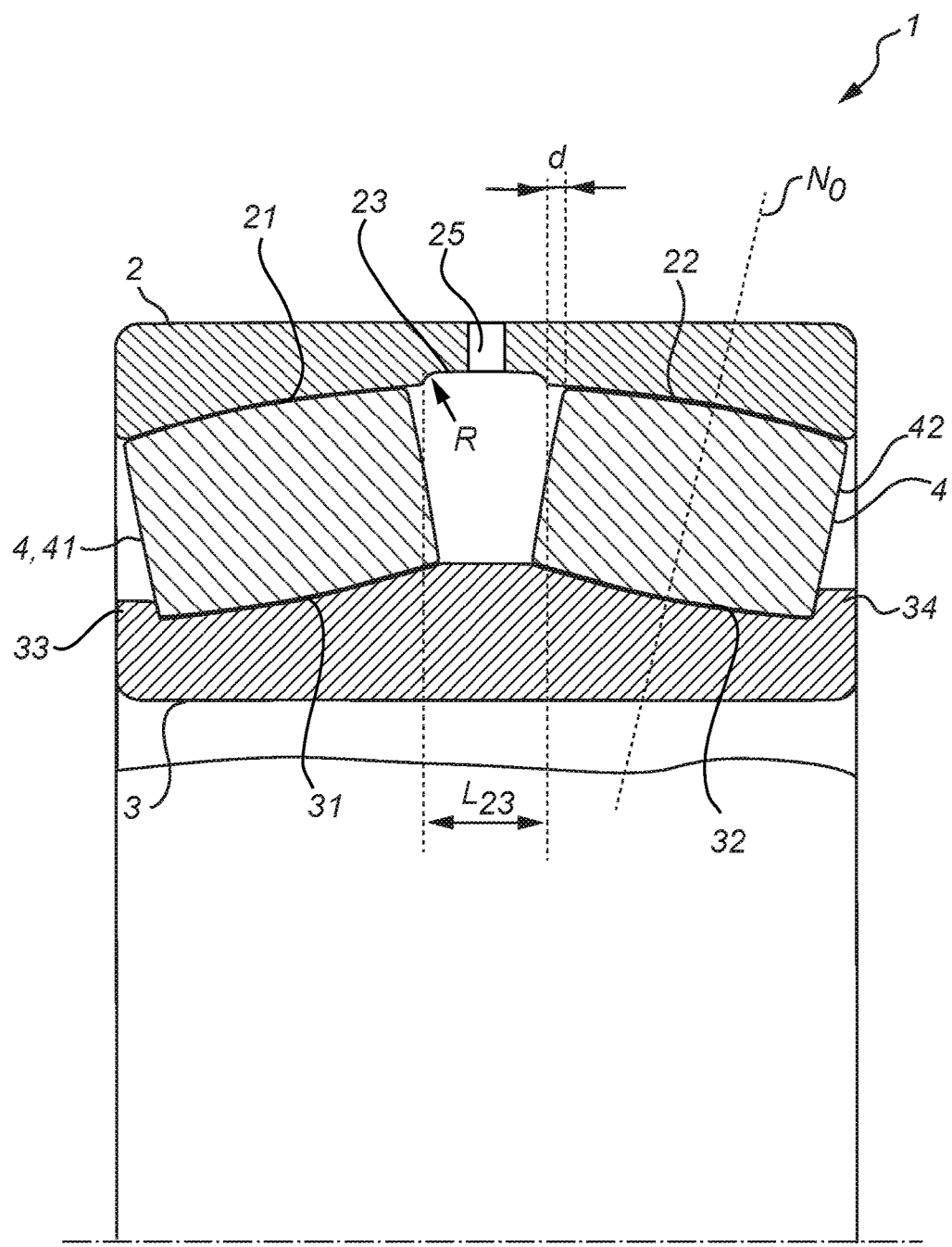
FIG. 1 shows a cross sectional view of a roller bearing according to an embodiment of the present disclosure.

The drawings show diagrammatic exemplifying embodiments of the present disclosure and are thus not necessarily drawn to scale. It shall be understood that the embodiments shown and described are exemplifying and that the disclosure is not limited to these embodiments. It shall also be noted that some details in the drawings may be exaggerated in order to better describe and illustrate the disclosure.

DETAILED DESCRIPTION OF DRAWINGS

In FIG. 1, a cross sectional view of a double-row spherical roller bearing 1 according to an embodiment of the present disclosure can be seen. The bearing 1 comprises an outer ring 2 which presents a first and a second spherical raceway 21 and 22 on a radially inner peripheral surface, an inner ring 3 which presents a first and a second outer curved-shaped raceway 31 and 32 respectively. Moreover, roller elements 4 are arranged in a first and second roller row 41 and 42, which are axially displaced from each other, and arranged in-between the respective first and second inner raceways 21 and 22 of the outer ring 2 and the first and second outer raceways 31 and 32 of the inner ring 3. The outer ring 2 further presents a first groove 23 on the radially inner peripheral surface located in-between the first and second inner raceways 21 and 22, and extends radially outwardly and in the circumferential direction of the ring 2, wherein the first and second inner raceways 21 and 22 present hard turned surfaces and wherein the first groove 23 presents a hardened surface which has not undergone any post-hardening machining operation. Further, as can be seen in this figure, the first groove 23 presents, at an axial end, a radius R. The radius R is set to 6-10 millimeters, or more preferably to essentially 8 millimeters. The width L23 of the first groove 23 is set such that the rings 2 and 3 will be able to misalign relative each other without any of the roller elements 4 interfering with the first groove 23. At the roller element's 4 nominal roller position N0, a distance d will be seen on the raceway surface 22 between the axial end of the roller element 4 and the corresponding axial end of the first groove 23. This distance d may be set differently depending on the intended application into which the bearing 1 shall be used. In other words, distance d shall be set according to the maximum allowed misalignment between the rings 2 and 3. In another embodiment, there may be a certain degree of overlap between the roller element 4 and the first groove 23 during misalignment of the rings 2 and 3. In a specific embodiment, the overlap is within 10% of the axial width of the roller 4. In addition, the axial width L23 may be set with regard to the load carrying capability of the ring 2. Thus care may be taken regarding the bearing's 1 load carrying capability when designing the first groove 23. Further in the figure, a first and a second flange 33 and 34 on the inner ring 3 can be seen. The flanges 33 and 34 may function as a guiding flange and/or a retaining flange for the rollers 4. In another embodiment there are no flanges on the inner ring 3. The bearing 1 may also be equipped with a cage/retainer for the roller elements 4. In addition, the bearing 1 may be equipped with a guiding ring located between the roller rows 41 and 42, which guiding ring may be used to guide the roller rows 41 and 42 during operation of the bearing 1. Further in this figure, a lubrication bore 25 can be seen. The lubrication bore 25 may be made in a soft state, i.e. before any hardening has been performed, which will reduce the cost of making the ring 2.

Figure 2:
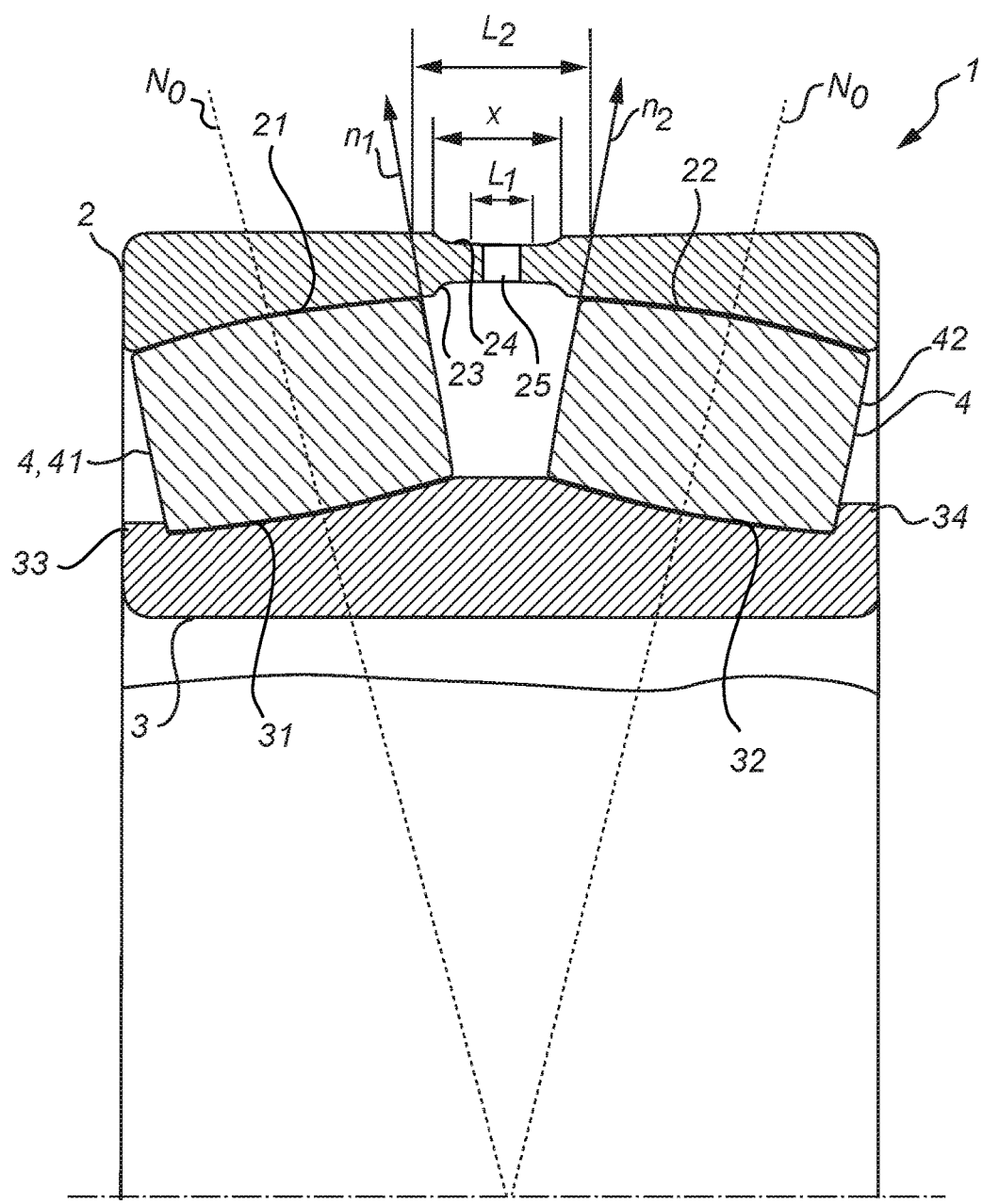
FIG. 2 shows a cross sectional view of another embodiment of a double-row spherical roller bearing of the present disclosure.

Now turning to FIG. 2, another embodiment of the present disclosure of a double-row spherical roller bearing 1 can be seen. The bearing 1 comprises an outer ring 2 which presents a first and a second spherical raceway 21 and 22 on a radially inner peripheral surface, an inner ring 3 which presents a first and a second outer curved-shaped raceway 31 and 32 respectively. Moreover, roller elements 4 are arranged in a first and second roller row 41 and 42, which are axially displaced from each other, and arranged in-between the respective first and second inner raceways 21 and 22 of the outer ring 2 and the first and second outer raceways 31 and 32 of the inner ring 3. The outer ring 2 further presents a first groove 23 on the radially inner peripheral surface located in-between the first and second inner raceways 21 and 22, and extends radially outwardly and in the circumferential direction of the ring 2, wherein the first and second inner raceways 21 and 22 present hard turned surfaces and wherein the first groove 23 presents a hardened surface which has not undergone any post-hardening machining operation. Further in this figure, a first and a second flange 33 and 34 on the inner ring 3 can be seen. The flanges 33 and 34 may function as a guiding flange and/or a retaining flange for the rollers 4. The bearing 1 may also be equipped with a cage/retainer for the roller elements 4. In addition, the bearing 1 may be equipped with a guiding ring located between the roller rows 41 and 42, which guiding ring may be used to guide the roller rows 41 and 42 during operation of the bearing 1. Further in this embodiment, the outer ring 2 presents a second groove 24 located on the radially outer peripheral surface of the outer ring 2. The second groove 24 has in this embodiment not undergone any post-hardening machining operation. Therefore, the second groove 24 will present a somewhat black or grey color, which is an effect of the hardening process. The roller elements 4 in each roller row presents a nominal roller position N0 in the bearing 1, and the second groove 24 further presents a width X and location on the outer peripheral surface which fulfills the following relation:

$$L_1 \leq X \leq L_2,$$

wherein $L_2$ extends between a first and second axial end point on the outer peripheral surface, which first end point is defined as the intersection between a first normal vector $n_1$ and the outer peripheral surface, wherein the first normal vector $n_1$ is an inverted normal vector of the first inner raceway 21 and starts from a position located at the axially inner end face of a roller 4 in the first roller row 41 at its nominal roller position $N_0$, and which second end point is defined as the intersection between a second normal vector $n_2$ and the outer peripheral surface, wherein the second normal vector $n_2$ is an inverted normal vector of the second inner raceway 22 and starts from a position located at the axially inner end face of a roller 4 in the second roller row 42 at its nominal roller position $N_0$, and wherein $L_1$ has a length of $L_2*\frac{1}{3}$ and where the end points of $L_1$ are located with equal distances to each respective first and second end point of $L_2$. By having a second groove 24 which is as large as possible without negatively affecting the performance of the bearing, the cost in manufacturing may be even further reduced. It has namely been realized by the inventors that by having a second groove 24 which presents the above defined axial width, a relatively large groove can be accomplished without negatively affecting the bearing performance. More specifically, when the outer ring 2 is subjected to a load, stress zones will be created at the contact area between the outer ring 2 and the roller elements 4. If the second groove 24 is extending axially such that it does not enter the area of the stress zones, the bearing performance will not be negatively affected. Thus, the combination of the first groove 23 and the second groove 24 will lead to a bearing 1 which will be cheaper to produce and at the same time its performance will not be negatively affected. Further in this figure, a lubrication bore 25 can be seen. The lubrication bore 25 may be made in a soft state, i.e. before any hardening has been performed, which will reduce the cost of making the ring 2.

Figure 3:
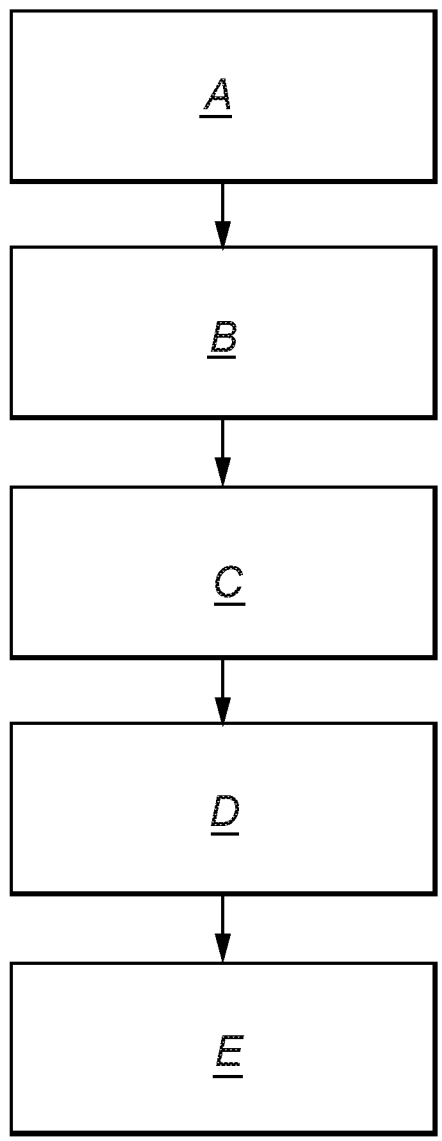
FIG. 3 shows an embodiment of the method according to the second aspect of the disclosure.

FIG. 3 shows a flow diagram of an embodiment of the method according to the present disclosure. The method is a method to manufacture an outer ring 2 of a double-row spherical roller bearing 1, wherein the outer ring 2 presents a radially outer peripheral surface and a radially inner peripheral surface. The method comprises the following steps:

A: soft-machining a first and a second surface 21 and 22 which extends in a circumferential direction on the radially inner peripheral surface, wherein the first and second surfaces 21 and 22 are axially displaced from each other, and B: soft-machining a first groove 23 on the radially inner peripheral surface which extends radially outwardly and in the circumferential direction, and wherein the first groove 23 is axially located in-between the first and second surfaces 21 and 22. Step A and B may also be performed in the opposite order, i.e. step B is first performed followed by step A. In addition, in another embodiment of the method, the first surface 21 is first soft machined, followed by soft-machining the first groove 23 which then is followed by soft-machining the second surface 22. Thus, any combination of step A and B, including any of the above mentioned soft machining steps can be performed in any order. This is then followed by the steps:

C: hardening the outer ring, and

D: subsequently hard machining the first and second surfaces.

In addition to this, a step E can be seen in the flow diagram. Step E represents the step of cup polishing the surfaces 21 and 22 after the hard turning step D. With this manufacturing process where there is a groove 23 on the radially inner peripheral surface of the outer ring 2, and wherein the groove 23 has not undergone any post-hardening machining operation, a more cost-efficient outer ring 2 can be realized. Especially, only the first and second raceways 21 and 22 on the outer ring have to undergo a post-hardening machining step. This leads to that a smaller surface has to undergo the post-hardening machining step. In addition, this will lead to that the wear of the machining tool, e.g. a hard turning cutting tool, will be reduced. This is not only related to the fact that a smaller surface has to be machined, but also the inventors have realized that there is a further advantage of having an interruption in the machining operation since that will lead to that the machining tool will have time to cool down between the machining operation of the first raceway surface 21 and the second raceway surface 22. Thus, in addition to the reduced wear of the machining tool, the quality of the two raceway surfaces 21 and 22 may be improved. Further, since the first groove 23 will not undergo any post-hardening machining step, the first groove 23 will present a somewhat black or grey color which emanates from the hardening of the ring 2. The visual appearance of a hardened steel surface is something which is easily recognized by a skilled person since the color of such a surface is somewhat black or grey. In addition, if a surface has undergone a post-hardening machining operation it can easily be recognized by a skilled person, especially since it is possible to see that there is a certain post-machining pattern and texture on the machined surface. Also, the black or grey color from the hardening will no longer be present. In addition, and not illustrated in this flowchart, another soft-machining step may be performed on the radially outer peripheral surface of the outer ring 2 to create a second groove 24. The second groove 24 extends radially inwardly and in the circumferential direction of the ring 2. After the hardening step, the second groove 24 may not undergo any post-hardening machining step.

Figure 4:
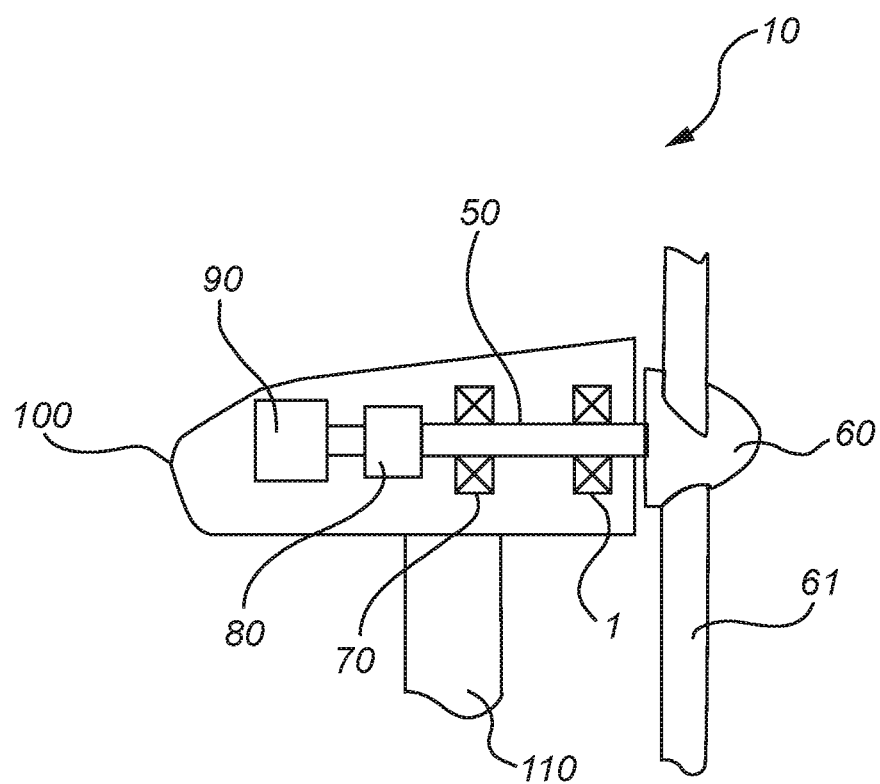
FIG. 4 shows a cross sectional view of an embodiment of a wind turbine bearing arrangement according to the present disclosure.

In FIG. 4, a cross sectional view of a wind turbine bearing arrangement 10 according to an embodiment of the present disclosure can be seen. A wind turbine bearing arrangement 10 is disclosed, comprising a rotor shaft 50 connected to a hub 60, wherein rotor blades 61 are connected to the hub 60. Furthermore, the arrangement comprises at least one bearing 1 for rotatably supporting the rotor shaft 50, wherein the bearing 1 is a double-row spherical roller bearing 1 according to any embodiment of the first aspect of the disclosure. The rotor shaft 50 is further supported by a second bearing 70. The bearings 1 and 70 are rotatably connected to the rotor shaft 50 and fitted into a housing structure (not shown), which in turn is connected to a nacelle 100 of the wind turbine 10. The rotor shaft 50 is connected to a generator 90. The torque generated from the blades 61 is transferred to the rotor shaft 50 and the torque is supplied to the generator 90 via a gearbox 80. There are also examples of wind turbines having no gearbox. The second bearing 70 can be any suitable bearing. For instance, the second bearing 70 is a toroidal roller bearing, a conical roller bearing or another spherical roller bearing according to any embodiment of the disclosure. The bearing arrangement in the wind turbine may be a two-point suspension or a three-point suspension arrangement.

What is claimed is:

1. A double-row spherical roller bearing, comprising, an outer ring presenting a first spherical raceway and a second spherical raceway on a radially inner peripheral surface;

an inner ring presenting at least one radially outer curved-shaped raceway;

roller elements arranged in a first roller row and a second roller row being axially displaced from each other, the roller elements being arranged in-between the respective first inner raceway and the respective second inner raceway of the outer ring and the at least one outer raceway of the inner ring; and a first groove, the first groove being formed on the radially inner peripheral surface on the outer ring located in-between the first inner raceway and the second inner raceway, extending radially outwardly, in the circumferential direction, wherein the first inner raceway and the second inner raceway present hard machined surfaces, wherein the first groove presents a hardened surface which has not undergone any post-hardening machining operation, wherein the outer ring further presents on its outer peripheral surface a second groove extending radially inwardly and in the circumferential direction, wherein the roller elements in each roller row present a nominal roller position in the bearing, wherein the second groove further presents a width X and location on the outer peripheral surface which fulfills the following relation:

$$L1 \leq X \leq L2,$$

wherein L2 extends between a first axial end point and a second axial end point on the outer peripheral surface, which first end point is defined as the intersection between a first normal vector and the outer peripheral surface, wherein the first normal vector is an inverted normal vector of the first inner raceway and starts from a position located at the axially inner end face of a roller in the first roller row at its nominal roller position, and which second end point is defined as the intersection between a second normal vector and the outer peripheral surface, wherein the second normal vector is an inverted normal vector of the second inner raceway and starts from a position located at the axially inner end face of a roller in the second roller row at its nominal roller position, and wherein L1 has a length of L2*⅓ and where the end points of L1 are located with equal distances to each respective first and second end point of L2.

2. The double-row spherical roller bearing according to claim 1, wherein the first groove has a radial depth of 2 to 6 millimeters.

3. The double-row spherical roller bearing according to claim 1,
wherein the first groove has a radial depth of substantially 4 millimeters.

4. The double-row spherical roller bearing according to claim 1,
wherein the first groove presents a maximum axial width extending such that the inner ring and the outer ring can be relatively misaligned up to 5 degrees without any roller element being displaced axially inwardly to an extent such that the roller element interferes with the first groove.

5. The double-row spherical roller bearing according to claim 1,
wherein the first groove has a minimum axial width of 10 millimeters.

6. The double-row spherical roller bearing according to claim 1,
wherein at least one axial end of the first groove has a radius of 6 to 10 millimeters.

7. The double-row spherical roller bearing according to claim 1,
wherein at least one axial end of the first groove has a radius of substantially 8 millimeters.

8. The double-row spherical roller bearing according to claim 1,
wherein the outer ring further presents at least one radially extending lubrication bore,
wherein the at least one lubrication bore presents an inlet on the radially outer peripheral surface and an outlet in the first groove.

9. A wind turbine comprising:
a hub,
a housing,
a rotor shaft connected to the hub and extending into the housing,
a plurality of rotor blades extending from the hub, and
a bearing according to claim 1 rotatably supporting the rotor shaft relative to the housing.

10. A double-row spherical roller bearing, comprising,
an outer ring having a radially inner surface and a radially outer surface and a first spherical raceway axially spaced from a second spherical raceway on the radially inner surface;
an inner ring having at least one curved, radially outer raceway;
a first plurality of roller elements arranged in a first roller row between the first spherical raceway and the at least one curved, radially outer raceway and a second plurality of roller elements arranged in a second roller row axially spaced from the first roller row between the second spherical raceway and the at least one curved, radially outer raceway,
a first circumferentially extending groove in the radially inner surface of the outer ring between the first spherical raceway and the second spherical raceway, the first groove extending radially outwardly, and
a second circumferentially extending groove in the radially outer surface of the outer ring having a width X,
wherein the first plurality of roller elements and the second plurality of roller elements are located in a nominal roller position in the bearing,
wherein a distance L2 is defined between a first point on the radially outer surface and a second point on the radially outer surface axially spaced from the first point, the first point being located at an intersection of a first normal vector and the radially outer surface, the first normal vector extending outwardly from the first spherical raceway at a location at an axially inner end face of one of the first plurality of rollers in the nominal roller position, and the second point being located at an intersection of a second normal vector and the radially outer surface, the second normal vector extending outwardly from the second spherical raceway at a location at an axially inner end face of one of the second plurality of rollers in the nominal roller position,
wherein a distance L1 is defined from a third point on the radially outer surface to a fourth point on the radially outer surface axially spaced from the third point, L1 being equal to ⅓*L2 and a distance from the first point to the third point being equal to a distance from the second point to the fourth point, and wherein $L1 \leq X \leq L2$.

11. A wind turbine comprising:
a hub,
a housing,
a rotor shaft connected to the hub and extending into the housing,
a plurality of rotor blades extending from the hub, and
a bearing according to claim 10 rotatably supporting the rotor shaft relative to the housing.

* * * * *